No. 721,847. PATENTED MAR. 3, 1903.
C. E. WHITE.
MECHANICAL MOVEMENT.
APPLICATION FILED SEPT. 29, 1902.
NO MODEL. 2 SHEETS—SHEET 1.
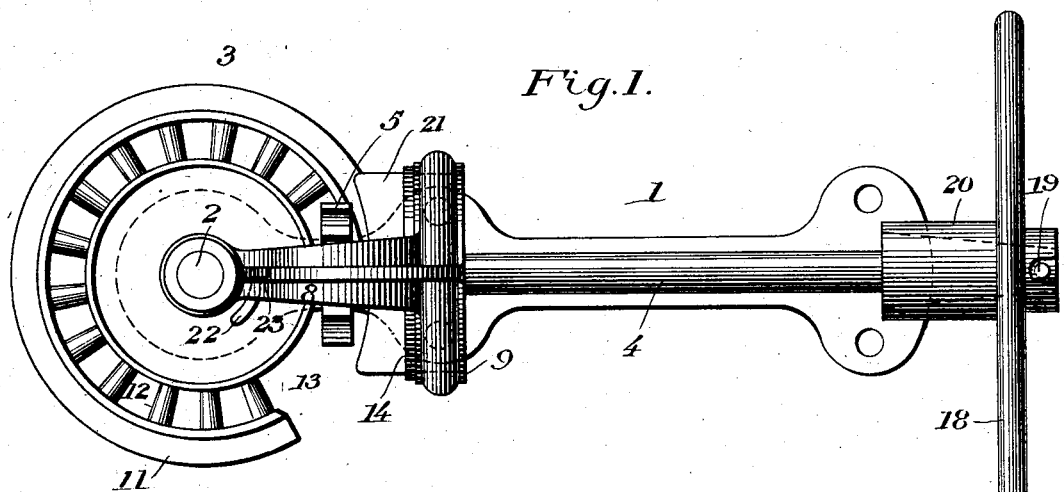
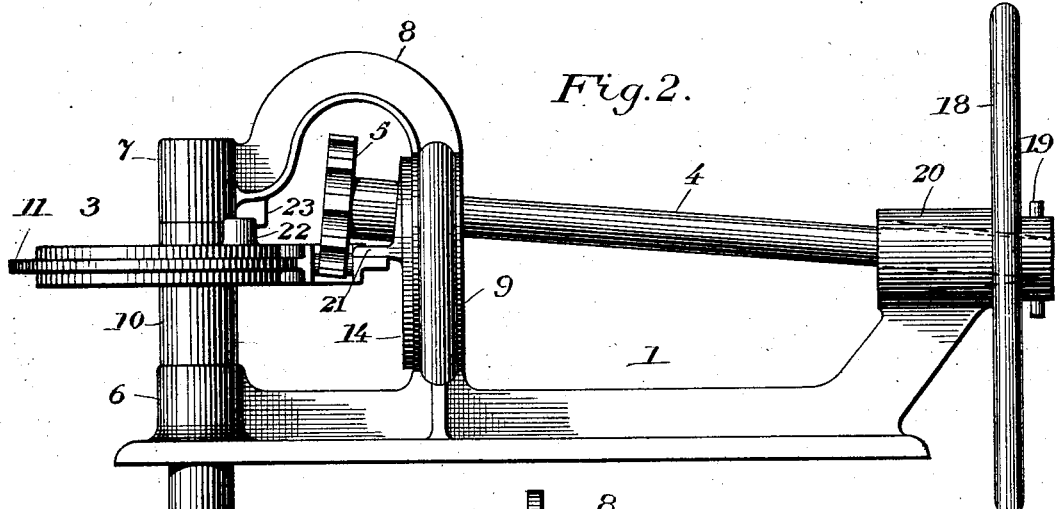
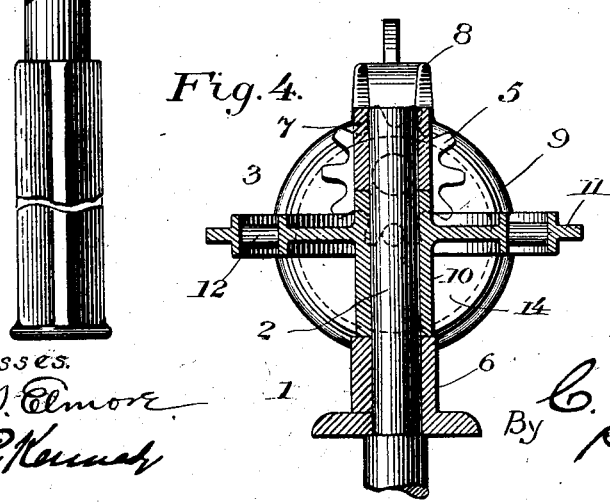

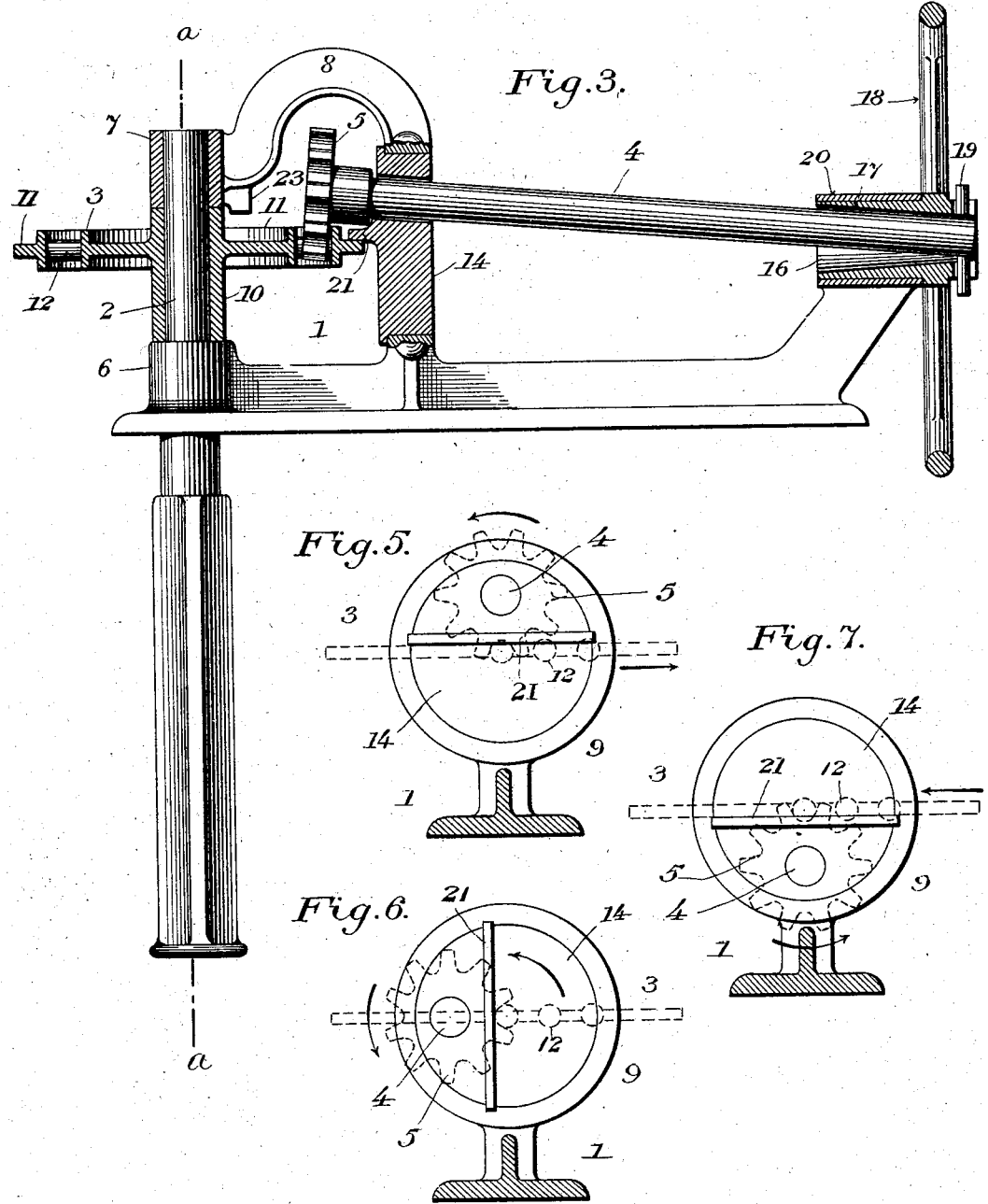

UNITED STATES PATENT OFFICE.

CHARLES E. WHITE, OF MOLINE, ILLINOIS.

MECHANICAL MOVEMENT.

SPECIFICATION forming part of Letters Patent No. 721,847, dated March 3, 1903.

Application filed September 29, 1902. Serial No. 125,202. (No model.)

*To all whom it may concern:*

Be it known that I, CHARLES E. WHITE, of Moline, county of Rock Island, and State of Illinois, have invented a new and useful Improvement in Mechanical Movements, of which the following is a specification.

This invention relates to a mechanical movement; and it consists of an improved construction for converting a rotary into a rotary reciprocating motion. Mechanisms of this character are employed in the mechanical arts in various classes of machines—for example, in washing-machines, where it is desired frequently to impart a rotary reciprocating motion to the rubber or agitator. While I contemplate such use of my invention, it will be understood that it is not limited in this particular, but may be employed wherever it is desired to convert a rotary into a rotary reciprocating motion.

In the accompanying drawings, Figure 1 is a top plan view of my improved mechanism. Fig. 2 is a side elevation of the same. Fig. 3 is a longitudinal vertical sectional elevation. Fig. 4 is a transverse sectional elevation on the line *a a* of Fig. 3. Figs. 5, 6, and 7 are diagrammatic views showing how the driving-pinion passes around the ends of the circular rack from the upper to the under side of the same.

Referring to the drawings, my improved device comprises as its essential features a suitable frame 1, a vertically-driven shaft 2, mounted therein, a circular rack 3 on said shaft, a horizontal rotary driving-shaft 4, mounted in the frame, and a driving-pinion 5, carried by the horizontal shaft and adapted to engage alternately with the upper and under sides of the rack and to impart thereto a rotary reciprocating motion.

The driven shaft is mounted in a lower bearing 6 in the base of the frame and an upper bearing 7 in an overhanging arm 8, extending from the upper end of a standard 9, rising vertically from the frame adjacent to the lower bearing.

The circular rack 3, before alluded to, is mounted on the vertical shaft between its two bearings, and it consists of a central hub 10, a surrounding rim 11, and a series of radial pins or rack-teeth 12, extending from the hub to the rim and connecting these parts. The rack-teeth and the surrounding rim do not extend continuously around the hub, but are interrupted for some distance, as at 13, so as to permit the pinion 5 to pass from one side of the rack to the other, as will be more fully described hereinafter.

The driving-pinion 5 is fixed to one end of the horizontal shaft 4, which latter is mounted for rotation in a bearing 14 adjacent to the pinion, which bearing is in the form of a vertical disk or eccentric mounted loosely, so as to be capable of a turning movement in the standard 9, so that the shaft is not only rotatable, but is also movable up and down bodily in the arc of a circle described from the center of the disk, which bodily movement takes place when the pinion passes around the ends of the rack from one side of the same to the other.

The opposite end of the horizontal driving-shaft extends within a flaring opening 16 in a hub 17 of a hand-wheel 18, and the shaft is secured therein by a pin 19, extending through the hub and the end of the shaft in such manner as to constitute a jointed connection between the shaft and the hand-wheel, permitting the shaft to rock with reference to the wheel on the pin as an axis. The hub of the hand-wheel is mounted for rotation in a horizontal bearing 20 on the frame, so that when the hand-wheel is rotated it will impart a corresponding motion to the driving-shaft, which will rock within the flaring opening in the hub as the pinion on the opposite end of the shaft moves vertically in passing from one side of the circular rack to the other.

By reason of the construction described the rotation of the hand-wheel and its connected shaft will tend to turn the rotatable bearing 14 in the standard, and in order to prevent this I provide the disk constituting the bearing with a horizontally-projecting flat wing or flange 21, which when the pinion is on the upper side of the rack will rest on the upper side of rim 11 and when the pinion is in engagement with the opposite side of the rack will bear on the under side of the rim. In this manner the pinion is maintained in proper engagement with the teeth on the rack and the shaft is prevented from moving up or down until at the proper time, when the end of the rack arrives beneath the pinion, as shown in Fig. 5, at which time the end of the rim passes to such a point that it ceases to support the wing and the disk will turn in the standard, carrying the pinion around the end tooth of the rack to the under side and carrying the wing downward through the open space in the rim, as shown in Figs. 6 and 7, the disk making half a revolution and the wing bearing on the under side of the rim, as shown in Fig. 7.

In order that the circular rack may be arrested at the proper points in its movement to admit of the foregoing actions of the pinion and so that the end tooth of the rack may be prevented from passing to a point where it will disengage from the pinion, I provide the hub 10 of the rack with a lug or stop 22, Figs. 1 and 2, which when the rack has reached the limit of its movement in either direction will engage a stop 23, depending from the under side of the overhanging arm 8, and hold the rack so that its last tooth will act as a fixed fulcrum for the pinion to turn on in the arc of a circle as it passes from one side of the rack to the other.

The relation of the pin 19 (by which the driving-shaft is jointed to the hand-wheel) to the rack is such that when the pinion moves up or down through the space in the rack the pin will extend at right angles to such movement and will form an axis for the shaft to rock on.

The operation of the mechanism described is as follows: Assuming that the parts are in the position of Fig. 5, where the rack has nearly reached the limit of its movement in the direction of the straight arrow, the continued rotation of the pinion in the direction of the curved arrow will move the rack still farther and until it is arrested by the coöperation of the stops in the position shown in Fig. 1. The rim-support for the wing now being removed, the further rotation of the pinion will cause the disk bearing, which carries the driving-shaft, to turn to the left, as indicated by the arrow, Fig. 6, the wing passing downward through the open space in the rack and the pinion maintaining engagement with and turning on the last tooth of the rack as a fulcrum. This turning movement of the pinion will continue until it arrives at the under side of the rack, when the wing will contact with the under side of the rim, as shown in Fig. 7, thereby preventing further rotary movement of the disk bearing. The continued movement of the pinion in this position will reverse the motion of the rack, as indicated by the arrow in Fig. 7. The rack will now continue its motion in this direction until the stops arrest the same and the open space in the rack permits the disk bearing to turn again, whereupon the pinion will pass upward around the opposite end tooth of the rack to the upper side of the same and will again reverse its direction of movement. It is seen, therefore, that by the continued rotation of the driving-shaft in one direction the rack will be reciprocated alternately in opposite directions, the driving-pinion passing alternately up and down around the ends of the rack and engaging alternately the opposite sides of the same.

The specific means described and shown for preventing the movement of the rotary bearing in which the driving-shaft is mounted may be replaced by other means, such as would suggest themselves to the skilled mechanic, and my invention is not, therefore, limited in this particular, but is intended to embrace as well any means by which the movement of this bearing is prevented until the rack arrives at the proper point to permit the pinion to pass around the end of the same.

Having thus described my invention, what I claim is—

1. In a mechanical movement the combination of a frame, a rotatable bearing mounted therein, a driving-shaft mounted for rotation in said bearing, means for rotating said shaft, a pinion on the shaft, a rack engaged by the pinion, and means for controlling the rotary motion of the bearing.

2. In a mechanical movement the combination of a frame, a rotatable bearing mounted therein, a driving-shaft mounted for rotation in said bearing, means for rotating said shaft, a pinion on the shaft, a circular rack engaged by the pinion and formed with an opening between its ends for the passage of the pinion from one side of the rack to the other, and means for controlling the motion of the movable bearing.

3. In a mechanical movement the combination of a frame, a rotatable bearing mounted therein, a driving-shaft mounted to rotate in said bearing, a pinion on the shaft, a circular rack engaged by said pinion and formed with an open space for the passage of the pinion from one side of the rack to the other, and means for preventing the rotation of the bearing until the rack is in position to permit the passage of the pinion through the space therein.

4. In a mechanical movement the combination with a frame, of a rotary driving-shaft mounted therein and movable at one end independently of its rotary movement and at an angle to its axis, a hand-wheel mounted in bearings on the frame and formed with a flaring opening in which the opposite end of the driving-shaft extends, and a jointed connection between said shaft and the hand-wheel.

5. In a mechanical movement the combination with a frame, of a rotatable bearing therein, a horizontal shaft mounted near one end in said bearing and rotatable therein, means for rotating said shaft in its bearing, a horizontal circular rack formed with a space between its ends, a pinion on the shaft engaging the rack and adapted to pass through said opening, and means for controlling the movement of the bearing.

6. In a mechanical movement the combination with a frame, of a vertical standard rising therefrom, a vertical bearing-disk mounted for rotation in said standard, a horizontal driving-shaft mounted for rotation in said bearing-disk, means for rotating the shaft, a horizontal circular rack formed with an open space between its ends, a pinion on the driving-shaft engaging the rack and adapted to pass through the space therein, means for holding the bearing against rotation while the rack is in motion, means for arresting the motion of the rack at predetermined times, and means for releasing the bearing when the rack is at rest.

7. In a mechanical movement the combination with a frame, of a rotary driving-shaft mounted therein and movable at an angle to its axis, a circular rack formed with an open space between its ends, a pinion on the shaft engaging the rack and movable through said space from one side of the rack to the other, and means for arresting the motion of the rack during the whole time that the pinion is passing from one side of the rack to the other.

8. In a mechanical movement the combination with a frame, of a horizontal circular rack mounted in bearings therein and formed with an open space between its ends, a rotary driving-shaft mounted in the frame and movable at an angle to its axis and independently of its rotation, a stop on the rack, a coöperating stop on the frame arranged with relation to each other to arrest the motion of the rack at predetermined points in its movement, and a pinion on the shaft engaging the rack and adapted to pass through the space therein when the rack comes to a rest.

9. In a mechanical movement the combination with a frame, of a vertical bearing-disk mounted loosely therein, a horizontal driving-shaft mounted for rotation in said disk, means for rotating said shaft, a horizontal circular rack having a peripheral rim and formed with an open space between its ends, a projection on the disk bearing adapted to bear on said rim, and a pinion on the shaft engaging the rack; whereby the motion of the disk bearing will not be permitted until the open space in the rack is in position to permit of the passage of the pinion therethrough.

10. In a mechanical movement the combination with a reciprocating rack, of a driving-pinion movable at the ends of the rack from one side of the same to the other, means for guiding said pinion in a curved path around the ends of the rack, means for holding the rack at rest while the pinion is passing around the ends of the same, and means for rotating said pinion.

In testimony whereof I hereunto set my hand, this 24th day of September, 1902, in the presence of two attesting witnesses.

CHARLES E. WHITE.

Witnesses:
W. V. J. MOORE,
S. H. JORDAN.